(12) United States Patent
Vijayasankar et al.

(10) Patent No.: US 9,872,246 B2
(45) Date of Patent: Jan. 16, 2018

(54) POWER CONSERVATION IN CHANNEL HOPPING WIRELESS NETWORK BY INDEPENDENT DEFINITION OF SLEEP INTERVALS AT EACH NODE

(71) Applicant: TEXAS INSTRUMENTS INCORPORATED, Dallas, TX (US)

(72) Inventors: Kumaran Vijayasankar, Allen, TX (US); Arvind Kandhalu Raghu, Plano, TX (US); Ramanuja Vedantham, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 94 days.

(21) Appl. No.: 15/007,221

(22) Filed: Jan. 27, 2016

(65) Prior Publication Data

US 2016/0262098 A1    Sep. 8, 2016

Related U.S. Application Data

(60) Provisional application No. 62/128,278, filed on Mar. 4, 2015.

(51) Int. Cl.
*H04L 12/50* (2006.01)
*H04W 52/02* (2009.01)
*H04B 1/713* (2011.01)

(52) U.S. Cl.
CPC ........ *H04W 52/0209* (2013.01); *H04B 1/713* (2013.01); *H04W 52/0216* (2013.01); *H04W 52/0219* (2013.01); *H04W 52/0229* (2013.01); *Y02B 60/50* (2013.01)

(58) Field of Classification Search
CPC ..................................................... H04W 4/00
USPC .......................................................... 370/311
See application file for complete search history.

(56) References Cited

U.S. PATENT DOCUMENTS

2007/0258508 A1*  11/2007  Werb ................... H04W 84/18
                                                          375/140

* cited by examiner

*Primary Examiner* — Dang Ton
(74) *Attorney, Agent, or Firm* — Ronald O. Neerings; Charles A. Brill; Frank D. Cimino

(57) ABSTRACT

Power conservation is provided in a network of globally unsynchronized wireless communication devices that use asynchronous channel hopping. Each wireless communication device defines its own channel hopping schedule. The channel hopping schedules include channel hop intervals when the device's receiver is active for receiving transmissions, and sleep intervals when the receiver is in a low power sleep state. Parameters associated with the sleep intervals are defined by each wireless communication device independently of external constraint.

22 Claims, 2 Drawing Sheets

POWER CONSERVATION IN CHANNEL HOPPING WIRELESS NETWORK BY INDEPENDENT DEFINITION OF SLEEP INTERVALS AT EACH NODE

This application claims 35 USC 119 priority to U.S. Provisional Application No. 62/128,278, filed on Mar. 4, 2015 and incorporated herein by reference.

FIELD

The present work relates generally to channel hopping in wireless communications and, more particularly, to power conservation in channel hopping wireless communication networks.

BACKGROUND

The documents listed below are incorporated herein by reference:
1. Part 15.4: Low-Rate Wireless Personal Area Networks (LR-WPANs), IEEE 802.15.4e 2012;
2. Technical Profile Specification Field Area Network, Wi-SUN Alliance 2014; and
3. Part 15.4: Low-Rate Wireless Personal Area Networks (LR-WPANs), IEEE 802.15.4 2011.

Channel hopping, while communicating between network devices (nodes), has been widely adopted in multiple wireless and wireline communication systems. Channel hopping essentially involves transmitting the radio signals on different carrier frequencies among many available sub-carriers at different instances of time. A pseudorandom sequence known to both the transmitter and receiver is usually used so that the transmitter transmits to the intended receiver on the channel where the receiver is listening. This improves robustness to external noise, and helps counter jamming and eavesdropping.

Channel hopping can achieve increased network throughput by permitting simultaneous data transfer over multiple channels between different pairs of nodes, and can enhance reliability in difficult channel conditions by exploiting channel diversity. Multiple technologies such as Bluetooth and Digital Enhanced Cordless Telecommunications (DECT) use channel hopping.

Channel hopping can be achieved through many different methods, for example, a synchronous method called Time Slotted Channel Hopping (TSCH), and an asynchronous method called Un-Slotted Channel Hopping (USCH), as defined document 1 referenced above. Many standards use a channel hopping MAC (Media Access Control) to define MAC protocols for different applications. For example, the Wi-SUN Alliance has proposed (see document 2 above) a Field Area Network (FAN) specification that uses USCH for smart grid applications.

In USCH, each node picks a hopping sequence and hops its receiver among the different channels. In each channel, a node spends a specified time called the dwell interval (also referred to herein as a channel hop interval or CHI). Many methods exist to track a receiver's USCH sequence, for example, the FH-Discover method proposed in document 2 above.

In USCH, channel hopping schedules are receiver-directed in that a transmitting node sends a transmission on the receiver's current channel hop (using a suitable collision avoidance technique such as Carrier Sense Multiple Access with Collision Avoidance, or CSMA-CA, to make a clear channel assessment, or CCA). If the transmission goes beyond the current CHI, then the transmission is continued into the adjacent (next successive) CHI, and the receiver continues listening on the current channel. If a transmission does so extend into the adjacent CHI, a second transmitter may try also to transmit to the receiver in that adjacent CHI, because the second transmitter assumes that the receiver is listening on the channel associated with the adjacent CHI. Thus, the transmission from the second transmitter will be lost, because the receiver has not switched to the channel associated with the adjacent CHI.

Some applications, like sensor networks, for example, have energy constraints. Hence, it becomes critical to provide for low-power operation to lower energy consumption. Many different low-power modes of operation have been proposed. Techniques like the inactive slot in super frame (defined in document 3 above), and a similar technique used in LLDN networks (see document 1 above) use dedicated pre-allocated sleep time for the whole network or part of the network, whereby all nodes in a target region can go to sleep. The needed coordination is achieved using synchronous beacons from coordinators.

When there is no global network level synchronization, and each node has its own sleep schedule, conventional methods like CSL (Coordinated Sample Listening) or RIT (receiver initiated transmissions) may be used. In CSL (see document 1 above), the transmitter uses wake up frames longer than the receiver's sleep interval to transmit to an unsynchronized receiver. The receiver sleep interval must either be a fixed value for all nodes, or limited to a maximum value for all nodes, so that a transmitter can know the minimum duration of the wake up frame.

In RIT (see document 1 above), the receiver wakes up periodically to request a transmission. A node intending to send a transmission to the receiver listens until it hears the receiver's request, and then sends the transmission to the receiver. CSL and RIT are typically used for single channel operation. Multiple channel extensions of these techniques would involve repeating the techniques for multiple different channels.

DETAILED DESCRIPTION

The present work has recognized that, if CSL is extended to globally unsynchronized networks that hop over multiple channels, the wake up frames would have to be extended to all channels, causing a large overhead. The process has to be repeated multiple times over different channels to synchronize the network. The present work has also recognized that a multi-channel extension of RIT is even more complicated, because the receiver would have to send the data request in each of the channels, and the transmitter would have to listen in each of the channels as well. This would result in long synchronization delays, especially in cases with a large number of channels, such as the 129 channels (at 50 Kbps data rate) in the Wi-SUN specification (see document 2 above).

The present work provides for low-power operation in globally unsynchronized networks that use asynchronous channel hopping, while avoiding disadvantages such as those noted above with respect to CSL and RIT, and without losing the benefits of asynchronous channel hopping.

Example embodiments of the present work facilitate power conservation in a globally unsynchronized network of wireless communication devices that use asynchronous channel hopping. Each wireless communication device (WCD) defines its own channel hopping schedule (CHS), including channel hop intervals (CHIs) when the device's receiver is active for receiving transmissions, and sleep intervals (SIs) when the receiver is in a low power sleep state. Parameters associated with the SIs are defined by each WCD independently of external (e.g., network) constraint. SI parameters include, for example, rate of occurrence of the SIs, respective durations of the SIs, and respective temporal locations of the SIs. In some embodiments, the SI parameters are defined based on factors such as energy constraints of the WCD, application layer requirements of the WCD, and traffic profiles known to the WCD.

Figure 1:
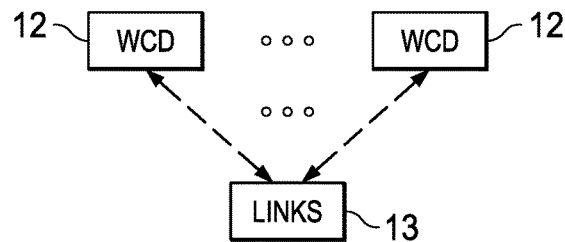
FIG. 1 diagrammatically illustrates a globally unsynchronized network of wireless communication devices according to example embodiments of the present work.

FIG. 1 diagrammatically illustrates a globally unsynchronized network of WCDs (or nodes) 12 according to example embodiments of the present work. The WCDs 12 communicate with one another via wireless communication links 13 established between respective pairs of the WCDs 12. In some embodiments, the WCDs 12 use asynchronous channel hopping, for example, USCH. The WCDs 12 and their operations are described in more detail below with respect to FIGS. 2-5.

Figure 2:
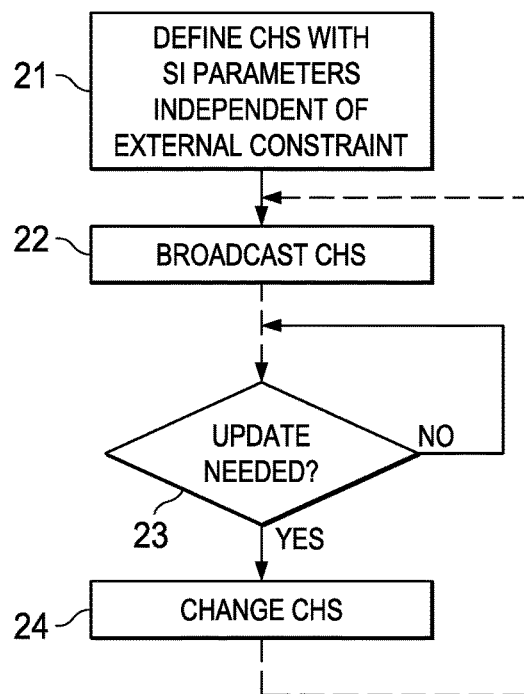
FIG. 2 illustrates operations that can be performed by each wireless communication device of FIG. 1 according to example embodiments of the present work.

FIG. 2 illustrates operations that can be performed by each WCD 12 of FIG. 1 according to example embodiments of the present work. At 21, the WCD defines its CHS, including active CHIs for receiving transmissions, and passive SIs for power conservation. Parameters associated with the SIs are defined independently and without any externally imposed constraint. Examples of such SI parameters include rate of occurrence of the SIs, respective durations of the SIs, and respective temporal locations of the SIs. In some embodiments, all of the CHIs of the CHS are of equal duration. In some embodiments, all CHIs used by all WCDs are of equal duration.

Figure 3:
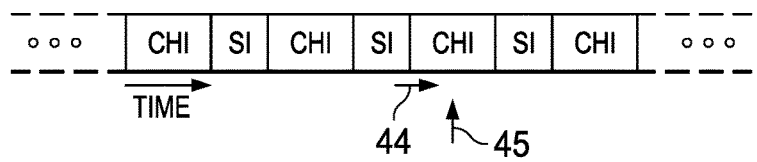
FIG. 3 shows a specific example channel hopping schedule with alternate channel hop intervals and silent intervals according to example embodiments of the present work.

In some embodiments, including some sensor embodiments, the CHS of a sensor/WCD consists entirely of a SI, so that the WCD is in power-conserving sleep mode at all times except when transmitting sensor data. In some embodiments, all SIs are of equal duration. In some embodiments, various SIs have respectively different durations. In some embodiments, the SIs occur periodically. In some embodiments, the SIs occur in a manner that is not periodic. In some embodiments, the rate of occurrence of the SIs in a given period of time remains constant over time. In some embodiments, the rate of occurrence in a given period of time varies over time. Various embodiments use various different combinations of the rate of occurrence, duration and temporal location parameters. FIG. 3 shows a specific example CHS with alternate CHIs and SIs, all of equal duration. In the example of FIG. 3, the SIs occur periodically, and their rate of occurrence in a given period of time remain constant over time.

After the CHS has been defined at 21 in FIG. 2, the WCD broadcasts its CHS to the other WCDs of the network at 22. Some embodiments use conventionally available techniques and resources to implement the broadcast at 22. For example, techniques and resources that are conventionally used to broadcast a conventional channel hopping schedule may be used to broadcast the CHS at 22.

Effective power conservation may be realized because each WCD defines its own CHS with SIs, independently of any other WCDs or network constraints. This affords the WCD significant flexibility to tailor its CHS in a manner that is advantageous to the WCD in terms of power consumption. One or more factors such as energy constraints of the WCD, application layer requirements of the WCD, and traffic profiles known to the WCD are used as a basis for defining the CHS in some embodiments.

In some embodiments, shown by broken line in FIG. 2, the WCD determines at 23 that its CHS needs updating, changes the CHS accordingly at 24, and broadcasts the changed CHS at 22. The CHS update at 23 may be needed, for example, due to changes in the factors (such as the examples described above) used to establish the CHS, or due to some other changed circumstance(s) impacting disadvantageously on power consumption of the WCD.

The CHSs defined by the various WCDs of the network need not be synchronized with each other, and neither the CHIs nor the SIs of the WCDs need be temporally aligned with each other. Each WCD needs only to know the respective CHSs of the other WCDs in order to transmit to the other WCDs. This will be described in more detail below.

Figure 4:
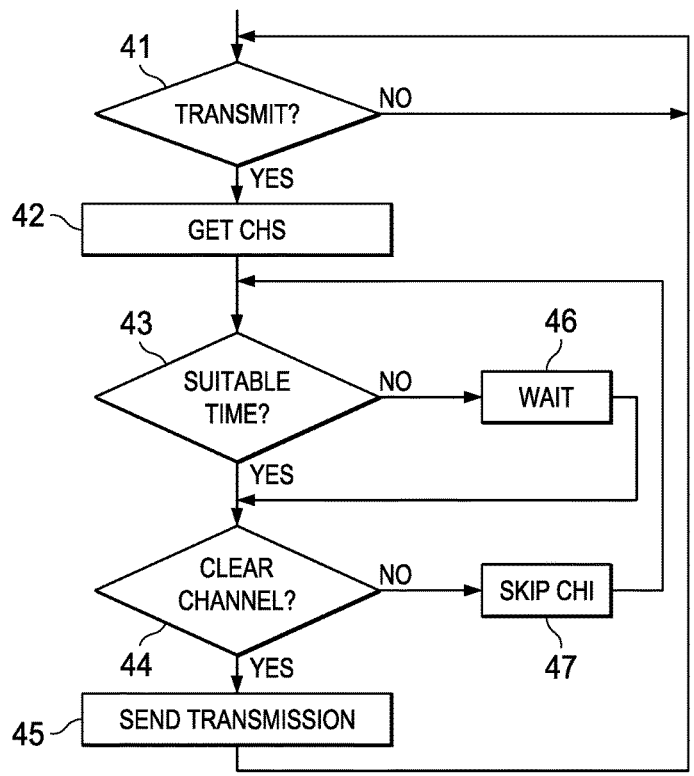
FIG. 4 illustrates operations that can be performed by the wireless communication devices of FIG. 1 according to example embodiments of the present work.

FIG. 4 illustrates operations that can be performed by the WCDs 12 of FIG. 1 according to example embodiments of the present work. After determining at 41 that transmission to a particular WCD is needed, the CHS for that particular WCD is retrieved at 42. It is then determined at 43, based on the retrieved CHS, whether the current time is suitable for commencing the transmission. For example, if the CHS is currently at or near the beginning of a CHI, then the current time is suitable for commencing the transmission on the channel associated with that CHI. On the other hand, if the CHS is currently near the end of a CHI, or in a SI, then the current time is not suitable for commencing the transmission. If the current time is determined at 43 to be suitable for sending the transmission, then a collision avoidance procedure is performed at 44 to make a clear channel assessment as to whether the channel is clear. If the channel is clear at 44, then the desired transmission is sent at 45.

If the current time is determined at 43 not to be suitable for commencing the transmission, e.g., because the intended recipient WCD is in a sleep state associated with a SI, then, in some embodiments, the sending WCD waits at 46 until the current sleep state of the intended recipient WCD expires and the intended recipient WCD enters a CHI. The clear channel assessment (CCA) is then performed at 44. In some embodiments, the sending WCD commences the clear channel assessment at 44 near, but before, expiration of the current sleep state of the intended recipient WCD. This is shown diagrammatically at 44 (perform CCA) and 45 (transmission sent) in the example of FIG. 3.

If the CCA is negative at 44, then the current CHI of the receiver is skipped at 47, and operation returns to 43.

In some embodiments, the wait at 46 in FIG. 4 is such that the transmit operations 44-45 correspond to a selected channel hop interval of the intended recipient WCD that occurs after expiration of the current sleep state of the intended recipient WCD, but is not the first channel hop interval of the intended recipient WCD that occurs after expiration of the current sleep state.

In some embodiments, the determination at 43 is omitted (see broken line in FIG. 4), and the wait at 46 includes computing the timing of transmit operations 44-45 to correspond to a channel hop interval selected a priori from the channel hopping schedule of the intended recipient WCD.

During the wait at 46, in some embodiments, the sending WCD goes into a sleep mode with respect to its task of transmitting to the intended recipient WCD, until the determined time of transmission arrives.

Consider again the example of FIG. 3, wherein the CHS is an alternating schedule that alternates successively between CHIs and SIs. This temporal location of SIs reduces delays in sending transmissions, and also permits a first transmission from a first WCD to extend beyond a given CHI without risk of losing a second transmission from a second WCD. This is so because the second WCD will refrain from sending the second transmission during the adjacent SI into which the first transmission extends, and will instead wait until it determines a suitable time for transmission (see also 43 and 46 in FIG. 4). This is in contrast to prior art schedules that locate CHIs adjacent one another. In that case, as noted above, the first transmission extends beyond the current CHI into an adjacent CHI, so the receiver (which has not yet hopped to the channel associated with the adjacent CHI) cannot receive the second transmission during the adjacent CHI.

Figure 5:
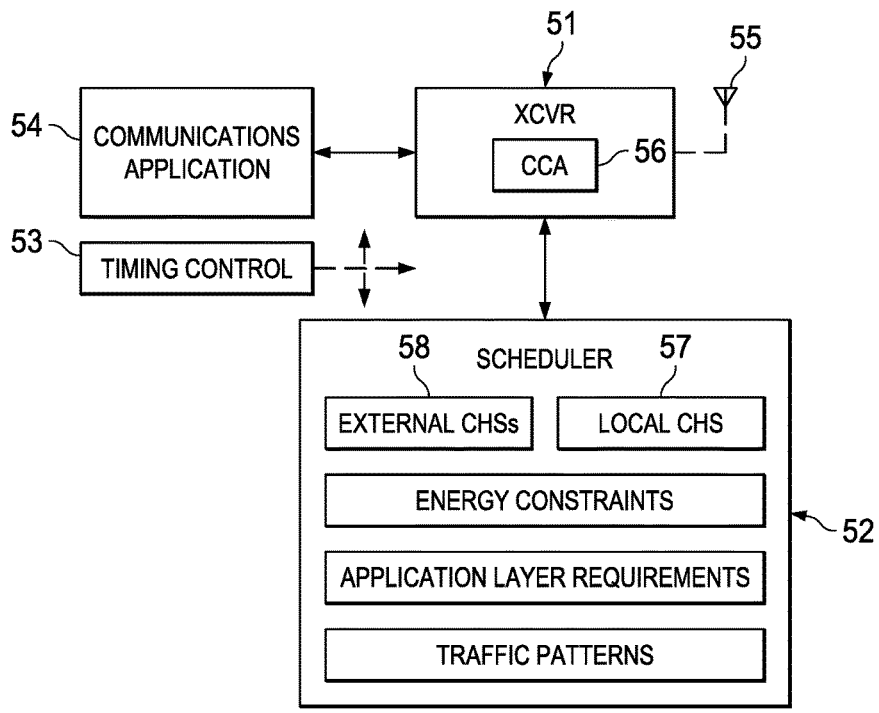
FIG. 5 diagrammatically illustrates a wireless communication device according to example embodiments of the present work.

FIG. 5 diagrammatically illustrates a WCD (such as a WCD 12 of FIG. 1) according to example embodiments of the present work. Some conventional components may be omitted to improve clarity. In various embodiments, the WCD of FIG. 5 can perform the operations described above relative to FIGS. 2-4. In some embodiments, the entities illustrated in FIG. 5 are implemented on one or more integrated circuits. A timing controller 53 provides suitable time base signals for controlling timing operations in the other illustrated entities. A transceiver (XCVR) 51 is configured to send and receive wireless transmissions (e.g., in support of a communications application such as shown at 54) via an antenna arrangement shown diagrammatically at 55. The term "transceiver" is used herein to designate any instrumentality configured to send and receive wireless transmissions via antenna arrangement 55, whether that instrumentality is embodied as an integrated composite (i.e., single) entity, or as distinct separate entities. As shown, the transceiver 51 includes, in some embodiments, conventional CCA facilities 56 to support collision avoidance when transmitting.

A scheduler 52 is configured to define a CHS for the WCD, designated as local CHS 57 in FIG. 5, and to direct broadcast of this local CHS via transceiver 51. As shown, the scheduler 52 has access to information indicative of various factors, such as energy constraints of the WCD, application layer requirements of the WCD, and traffic profiles, that are used in defining the local CHS 57. The scheduler 52 is further configured to receive, via transceiver 51, the CHSs broadcasted by other WCDs of the network, designated as external CHSs 58 in FIG. 5. The scheduler 52 uses the external CHSs 58 to control transmission operations (see also 42 in FIG. 4), and uses the local CHS 57 to control reception operations. In some embodiments, the scheduler 52 is implemented by a data processor and a memory coupled to one another for exchange of information.

As is apparent from the foregoing, the numerous advantages provided by the present work include, for example, improved power conservation in networks that are globally unsynchronized and use asynchronous channel hopping techniques (such as USCH). Advantageously, WCDs can define and dynamically adjust their own CHSs independently based on factors relevant to power conservation.

Although example embodiments are described above in detail, this does not limit the scope of the present work, which may be practiced in a variety of embodiments.

What is claimed is:

1. A method of limiting power consumption in a network of globally unsynchronized wireless communication devices that use asynchronous channel hopping over multiple channels, comprising:
   at each wireless communication device, defining for the wireless communication device a channel hopping schedule for receiving transmissions, wherein the channel hopping schedule includes sleep intervals associated with a low power sleep state, wherein said defining includes defining parameters for the sleep intervals independently of external constraint, and wherein said parameters include rate of occurrence of the sleep intervals, respective durations of the sleep intervals, and respective temporal locations of the sleep intervals;
   broadcasting from each of the wireless communication devices the associated channel hopping schedule; and
   receiving at each of the wireless communication devices the channel hopping schedules respectively associated with the other wireless communication devices.

2. The method of claim 1, including determining at a first wireless communication device, from the channel hopping schedule of a second wireless communication device, whether the second wireless communication device is currently in a sleep state and,
   if not, sending a transmission from the first wireless communication device to the second wireless communication device in a current channel hop interval of the second wireless communication device,
   if so, waiting at the first wireless communication device at least until the current sleep state of the second wireless communication device expires, and thereafter sending a transmission from the first wireless communication device to the second wireless communication device in a selected channel hop interval of the second wireless communication device.

3. The method of claim 2, wherein at least some of said channel hopping schedules are alternating schedules that alternate successively between sleep intervals and channel hop intervals.

4. The method of claim 3, wherein the second wireless communication device has said alternating schedule and said transmission extends beyond said current channel hop interval into an adjacent sleep interval of the alternating schedule while a third wireless communication device is waiting to transmit to the second wireless communication device after expiration of the adjacent sleep interval.

5. The method of claim 2, wherein the channel hopping schedule of the first wireless communication device consists entirely of a sleep interval.

6. The method of claim 2, including, during said waiting, commencing a clear channel assessment procedure at the first wireless communication device during the current sleep state of the second wireless communication device.

7. The method of claim 1, wherein said defining parameters for the sleep intervals is performed based on one of an energy constraint of the wireless communication device, an application layer requirement of the wireless communication device, and a traffic profile known to the wireless communication device.

8. The method of claim 7, including, at one or more of the wireless communication devices, dynamically changing the associated channel hopping schedule, and broadcasting the dynamically changed channel hopping schedule from the wireless communication device.

9. The method of claim 1, wherein the asynchronous channel hopping is unslotted channel hopping.

10. The method of claim 1, wherein some of said channel hopping schedules are alternating schedules that alternate successively between sleep intervals and channel hop intervals, and some of said channel hopping schedules consist entirely of a sleep interval.

11. A wireless communication device configured for limiting power consumption in a network of globally unsynchronized wireless communication devices that use asynchronous channel hopping over multiple channels, comprising:
 a scheduler configured to define for said wireless communication device a channel hopping schedule for receiving transmissions, wherein the channel hopping schedule includes sleep intervals associated with a low power sleep state, wherein said scheduler is further configured to define parameters for the sleep intervals independently of external constraint, and wherein said parameters include rate of occurrence of the sleep intervals, respective durations of the sleep intervals, and respective temporal locations of the sleep intervals; and
 a transceiver coupled to said scheduler and configured to broadcast said channel hopping schedule from said wireless communication device, and configured to receive other channel hopping schedules respectively associated with and broadcasted by other wireless communication devices in the network;
 wherein each of said other channel hopping schedules has been defined by the associated other wireless communication device, wherein each of said other channel hopping schedules includes sleep intervals that are provided for low power operation and have parameters defined by the associated other wireless communication device independently of external constraint, and wherein the parameters defined by each of said other wireless communication devices include rate of occurrence of the associated sleep intervals, respective durations of the associated sleep intervals, and respective temporal locations of the associated sleep intervals.

12. The wireless communication device of claim 11, wherein said scheduler is configured to determine from one of said other channel hopping schedules whether the associated one of said other wireless communication devices is currently in a sleep state and,
 if not, direct said transceiver to send a transmission to said one other wireless communication device in a current channel hop interval of said one other wireless communication device,
 if so, wait at least until the current sleep state of said one other wireless communication device expires, and thereafter direct said transceiver to send a transmission to said one other wireless communication device in a selected channel hop interval of said one other wireless communication device.

13. The wireless communication device of claim 12, wherein at least some of said other channel hopping schedules are alternating schedules that alternate successively between sleep intervals and channel hop intervals.

14. The wireless communication device of claim 13, wherein said one other wireless communication device has said alternating schedule and said transmission extends beyond said current channel hop interval into an adjacent sleep interval of the alternating schedule while a further one of said other wireless communication devices is waiting to transmit to said one other wireless communication device after expiration of the adjacent sleep interval.

15. The wireless communication device of claim 12, wherein said channel hopping schedule consists entirely of a sleep interval.

16. The wireless communication device of claim 12, wherein said scheduler is configured to direct said transceiver to commence a clear channel assessment procedure during said current sleep state while waiting for said current sleep state to expire.

17. The wireless communication device of claim 11, wherein said scheduler is configured to define said parameters for the sleep intervals based on one of an energy constraint of the wireless communication device, an application layer requirement of the wireless communication device, and a traffic profile known to the wireless communication device.

18. The wireless communication device of claim 17, wherein said scheduler is configured to dynamically change said channel hopping schedule, and wherein said transceiver is configured to broadcast the dynamically changed channel hopping schedule from said wireless communication device.

19. The wireless communication device of claim 11, wherein said scheduler and said transceiver are provided on one or more integrated circuits.

20. The wireless communication device of claim 11, wherein said channel hopping schedule is an alternating schedule that alternates successively between sleep intervals and channel hop intervals, and wherein said transceiver is configured to receive from one of said other wireless communication devices a transmission that extends beyond a current channel hop interval of the alternating schedule into an adjacent sleep interval while a further one of said other wireless communication devices is waiting to transmit to said wireless communication device after expiration of said adjacent sleep interval.

21. The wireless communication device of claim 11, wherein said scheduler is cooperable with said transceiver to send a transmission to one of said other wireless communication devices in a channel hop interval of said one other wireless communication device selected a priori by said scheduler from the channel hopping schedule associated with said one other wireless communication device.

22. The method of claim 1, including sending a transmission from a first wireless communication device to a second wireless communication device in a channel hop interval of the second wireless communication device selected a priori by the first wireless communication device from the channel hopping schedule associated with the second wireless communication device.

* * * * *